United States Patent [19]
Fukushima

[11] Patent Number: 5,584,712
[45] Date of Patent: Dec. 17, 1996

[54] CONNECTOR

[75] Inventor: Hirotaka Fukushima, Haibara-gun, Japan

[73] Assignee: Yazaki Corporation, Tokyo, Japan

[21] Appl. No.: 362,962

[22] Filed: Dec. 23, 1994

[30] Foreign Application Priority Data

Dec. 28, 1993 [JP] Japan .................. 5-334712

[51] Int. Cl.$^6$ .................................. H01R 13/44
[52] U.S. Cl. .................................. 439/141; 439/140
[58] Field of Search .................... 439/141, 140, 439/310

[56] References Cited

U.S. PATENT DOCUMENTS

| | | | |
|---|---|---|---|
| 4,340,267 | 7/1982 | Nukaga | 439/140 |
| 4,411,491 | 10/1983 | Larkin et al. | 350/96.21 |
| 4,797,116 | 1/1989 | Isohata et al. | 439/141 |
| 5,350,312 | 9/1994 | Kuno et al. | 439/310 |
| 5,490,790 | 2/1996 | Okada | 439/141 |

FOREIGN PATENT DOCUMENTS

| | | |
|---|---|---|
| 451305 | 10/1927 | Germany . |
| 471475 | 5/1969 | Germany . |
| 1490840 | 9/1969 | Germany . |
| 5-12953 | 5/1993 | Japan . |

*Primary Examiner*—David L. Pirlot
*Attorney, Agent, or Firm*—Armstrong, Westerman, Hattori, McLeland & Naughton

[57] ABSTRACT

A connector includes a male terminal housing section having an opening for receiving a female terminal housing section of a counter-connector for connection between a male terminal disposed in the male terminal housing section and a female terminal disposed in the female terminal housing section. The connector further includes an insulator cap slidably disposed in the male terminal housing section. The insulator cap has a guide hole for the male terminal and is biased by a spring toward the opening of the male terminal housing section. The insulator cap is positioned forward of a tip of the male terminal relative to the opening of the male terminal housing section so that contact of an operator's finger to the tip of the male terminal is reliably prevented when, for example, fixing the connector. On the other hand, when the female terminal housing section is received in the male terminal housing section, the insulator cap is forced rearward away from the opening of the male terminal housing section against a biasing force of the spring while guiding the male terminal through the guide hole for connection to the female terminal. The insulator cap can be easily removed from within the male terminal housing section using an arrangement of tapers provided both on the insulator cap and on an inner wall of the male terminal housing section.

5 Claims, 10 Drawing Sheets

5,584,712

CONNECTOR

BACKGROUND OF THE INVENTION

1. Field of the Invention

The present invention relates to a connector of a type where tip portions of terminals are projected in a fitting section of the connector for connection to a counter-connector, and more specifically, to the connector which is provided with an insulator cap for shielding the foregoing projecting terminal tip portions from the exterior.

2. Description of the Prior Art

As shown in FIG. 13, Japanese Utility Model Publication No. 512953 shows a connector, wherein a slide jig c having insertion guides $c_1$, $c_1$ is slidably disposed in a fitting section b, for connection to a counter-connector (not shown), of a connector housing a. The slide jig c is used for ensuring parallel posture of tip portions $e_1$, $e_1$ of terminals e mounted in a terminal mounting section d of the connector housing a. Reference symbols $b_1$, $b_1$ represent positioning projections provided on an internal wall of the fitting section b and axially spacing a given distance from each other. The slide jig c is temporarily fixed between the projections $b_1$, $b_1$. When the counter-connector is fitted into the fitting section b, the slide jig c is pushed backward toward the terminal mounting section d, passing over one of the positioning projections $b_1$ located in a pushed direction of the slide jig c.

When detaching the slide jig c for, such as, fixing the connector, since the terminal tip portions $e_1$, $e_1$ are exposed bare in the fitting section b, there is a possibility of danger of electric shock due to contact of a fingertip thereto. Further, since the slide jig c is located at the center of or at a position deep into the fitting section b before connection to or after disconnection from the counter-connector, it is hard to pull out the slide jig c from inside the connector. In addition, since the positioning projections $b_1$, $b_1$ work as obstacles to resist such pulling out of the slide jig c, it is possible that not only the terminal tip portions $e_1$, $e_1$ but the slide jig c are damaged.

SUMMARY OF THE INVENTION

Therefore, it is an object of the present invention to provide an improved connector, wherein an insulator cap is positioned forward of a tip of a male terminal when the connector is not fitted with a counter-connector. This is effective for preventing a fingertip from directly contacting the terminal so as to avoid possibility of electric shock.

It is another object of the present invention to provide an improved connector, wherein an insulator cap is easily mounted or dismounted from a front side of the connector without damaging a terminal and tile insulator cap itself.

According to a first aspect of the present invention, a connector comprises a connector body; a male terminal housing section provided in the connector body, the male terminal housing section having therein a male terminal extending toward an opening of the terminal housing section, the male terminal housing section adapted for receiving a counter-female terminal housing section from the opening for connection between the male terminal and a female terminal disposed in the counter-female terminal housing section; and an insulator cap slidably disposed in the male terminal housing section and biased toward the opening by biasing means, the insulator cap having a first wall confronting the opening, the first wall having a guide hole for the male terminal and being located at a position forward of a tip of the male terminal relative to the opening, the insulator cap forced rearward relative to the opening against a biasing force of the biasing means while guiding the male terminal through the guide hole when the female terminal housing section is received in the male terminal housing section.

According to a second aspect of the present invention, in the foregoing connector according to the first aspect, the insulator cap may have a peripheral wall integral with the first wall, the peripheral wall may include a flexible locking piece with a locking projection at its tip, and the male terminal housing section may be formed on its inner wall with a guide groove for engaging and guiding the locking projection of the flexible locking piece.

According to a third aspect of the present invention, in the foregoing connector according to the second aspect, the first wall may be formed with removing pin insertion holes radially outward of the guide hole, the locking projection may have a releasing taper at its one side, the guide groove may have a corresponding releasing taper at its one side confronting the releasing taper of the locking projection, and the engagement between the locking projection and the guide groove may be released by turning the insulator cap toward the one side of the guide groove via the removing pin insertion holes when the insulator cap is located at the foregoing position.

According to a fourth aspect of the present invention, in the foregoing connector according to the first aspect, the insulator cap may be located at the foregoing position against the biasing force of the biasing means by stopper means prodded both on the insulator cap and the male terminal housing section.

According to a fifth aspect of the present invention, in the foregoing connector according to the first aspect, the insulator cap may have a double tube structure having an outer tube and an inner tube which are connected by the first wall, the outer tube may be arranged to be slidable on an inner wall of tile male terminal housing section, and the inner tube may form the guide hole therethrough, the inner tube receiving and positioning therein the tip of the male terminal.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Figure 1:
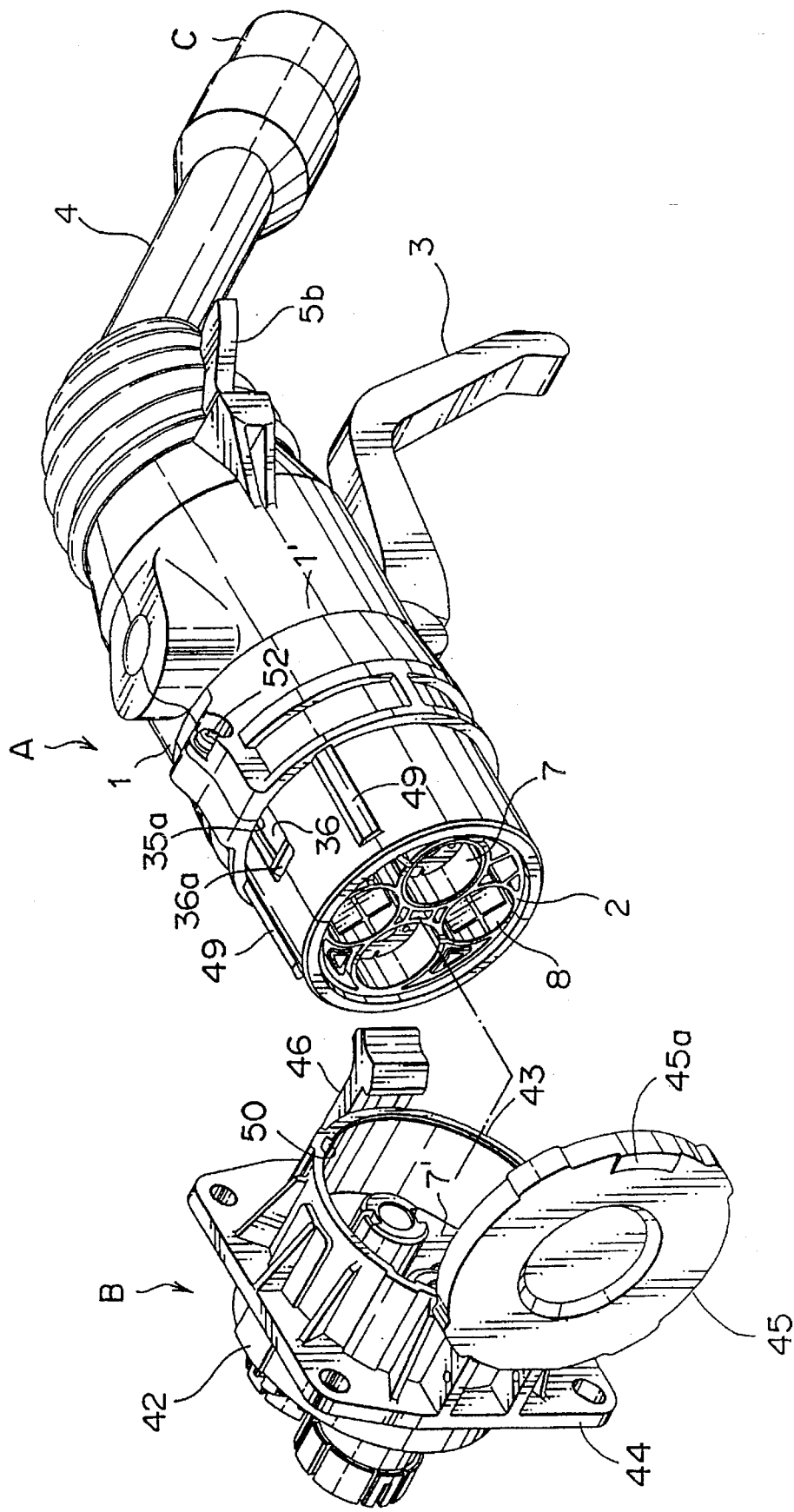
FIG. 1 is a perspective view showing a feeder-side connector and a receiver-side connector in a separated state, according to a first preferred embodiment of the present invention.

Now, a preferred embodiment of the present invention will be described hereinbelow with reference to the accompanying drawings.

In FIGS. 1 to 4, an alphabet A represents a feeder-side connector mounted to a feeder system (not shown), and an alphabet B represents a receiver-side connector fixedly to, such as, an automotive vehicle body.

The feeder-side connector A includes a pair of split cases 1, 1' confronting each other to be fixedly assembled. A connector body 2 is slidably disposed at a front side of the cases. At a rear side of the cases, a handle 4 is movably disposed for forcing the connector body 2 toward the receiver-side connector B in response to a pivotal movement of a lever 3. Further, at the rear side of the cases, a releasing lever 5 for locking the lever 3 primarily and an electromagnetic coil 6 for locking the releasing lever 5 secondarily are arranged. At a rear end of the handle 4, a cable C is introduced extending from the foregoing feeder system.

Figure 2:
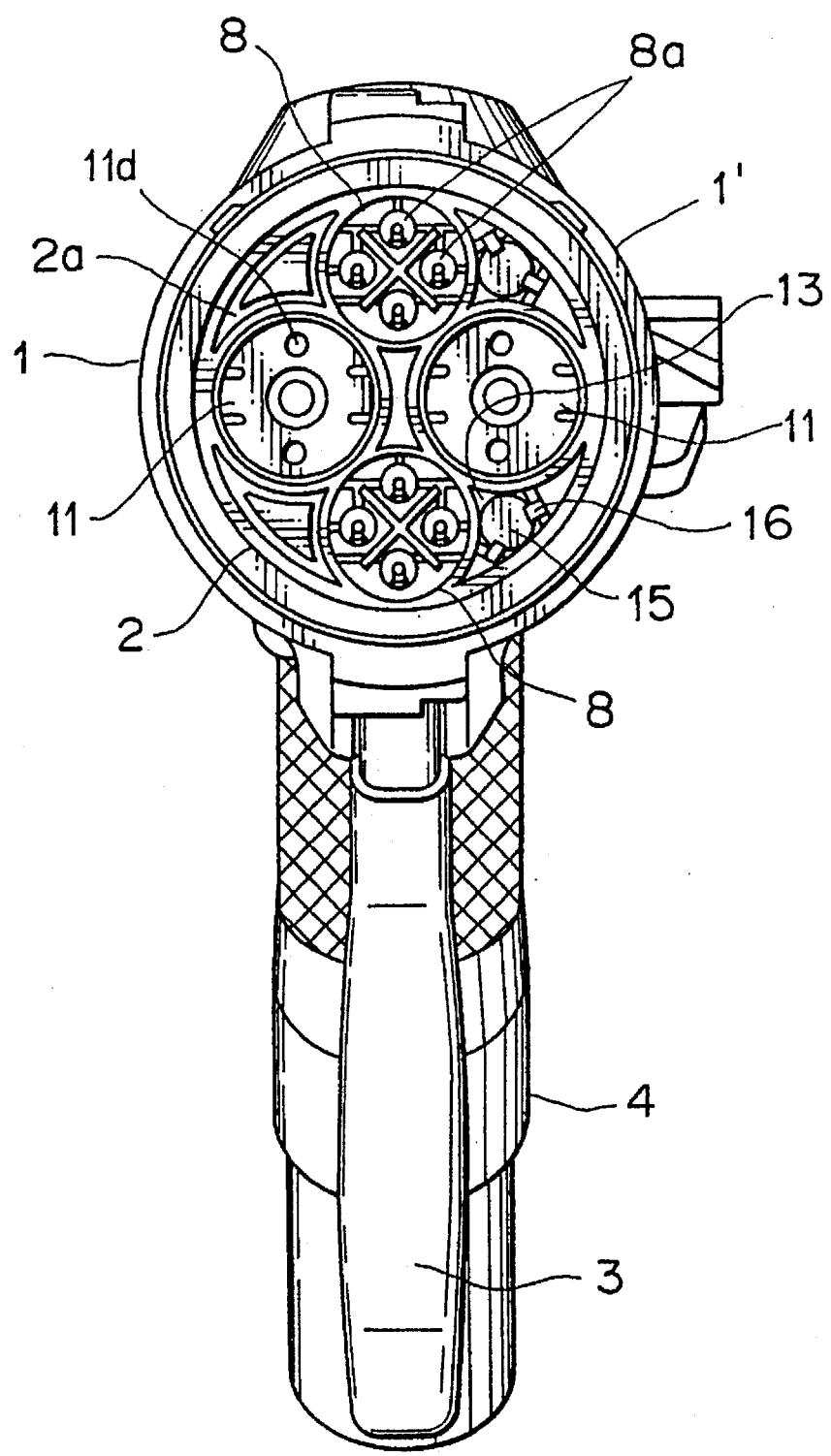
FIG. 2 is a front view showing the feeder-side connector shown in FIG. 1.
Figure 3:
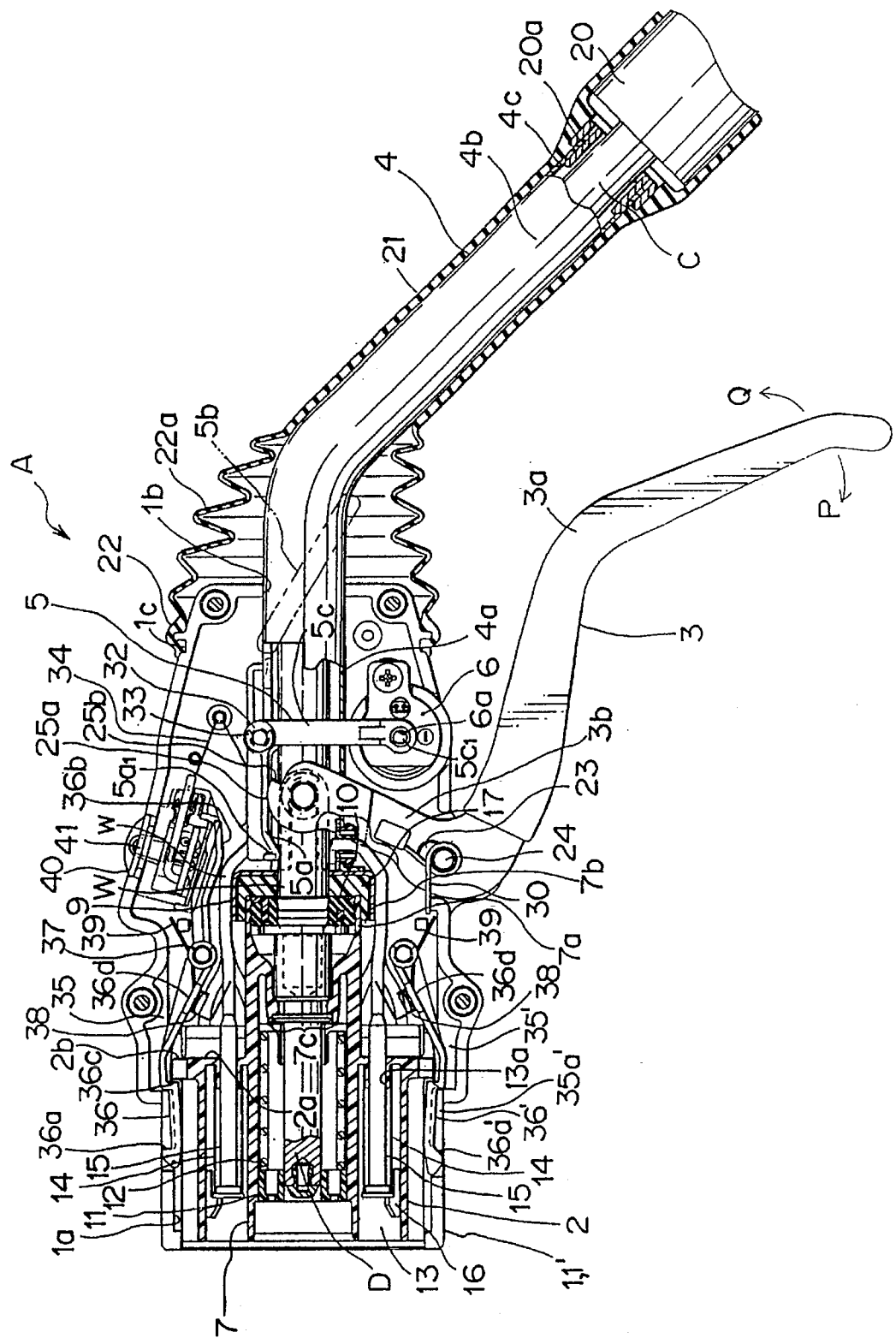
FIG. 3 is a longitudinal-sectional view showing the feeder-side connector shown in FIG. 1.

The connector body 2 is cylindrical. As shown in FIG. 2, the connector body 2 includes male terminal housing sections 7, 7 of a large diameter arranged at both left and right sides and projected from a bottom wall 2a thereof. The connector body 2 further includes composite terminal housing sections 8, 8 arranged vertically and projected from the bottom wall 2a. As shown in FIG. 3, the male terminal housing section 7 has a rearward projecting wall 7a extending rearward from the bottom wall 2a and received by a seat 7b. The seat 7b is in abutment with a pressing plate 9 provided at a front end of the handle 4. In the male terminal housing section 7, a male terminal D for feeding power is held in position by means of a pair of flexible arms 7c. In each of four cavities 8a of the composite terminal housing section 8, a male terminal (not shown) for a control circuit for controlling signals, displays and the like is mounted in position. To these male terminals in the terminal housing sections 7 and 8, leads W, w from the cable C are respectively connected in pressed fashion or the like. Rubber plugs 10 are further provided for these male terminals, respectively, in press-fit fashion so as to ensure waterproof sealing for each of the terminal housing sections to prevent short circuit between terminals. Further, at a front end portion of the male terminal housing section 7, an insulator cap 11 is disposed as being slidable in an axial direction of the male terminal housing section 7 for shielding the male terminal D from the exterior. A spring 12 is interposed between the insulator cap 11 and the male terminal housing section 7.

As shown in FIGS. 5 to 8, the insulator cap 11 includes a front wall 11a and a peripheral wall 11b in the form of an outer tube formed integral with the front wall 11a. A guide hole 11c is formed at the center of the front wall 11a so as to form an inner tube relative to the outer tube 11b for receiving and positioning therein a tip portion of the male terminal D. A pair of removing pin insertion holes 11d, 11d are formed in the front wall 11a outward of the guide hole 11c with respect to the center of the front wall 11a. The removing pin insertion holes 11d, 11d are arranged at diametrically opposite locations with respect to the center of the front wall 11a. On the other hand, the peripheral wall 11b is formed with a pair of flexible locking lugs 11e, 11e at diametrically opposite locations which are offset in angular phase by 90° as compared with the locations of the removing pin insertion holes 11d, 11d. Each of the locking lugs 11e is formed with a locking projection 11f at its tip.

Figure 6:
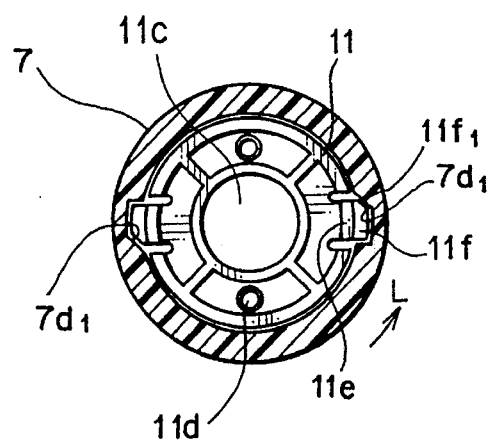
FIG. 6 is a cross-sectional view showing the male terminal housing section shown in FIG. 5.
Figure 7:
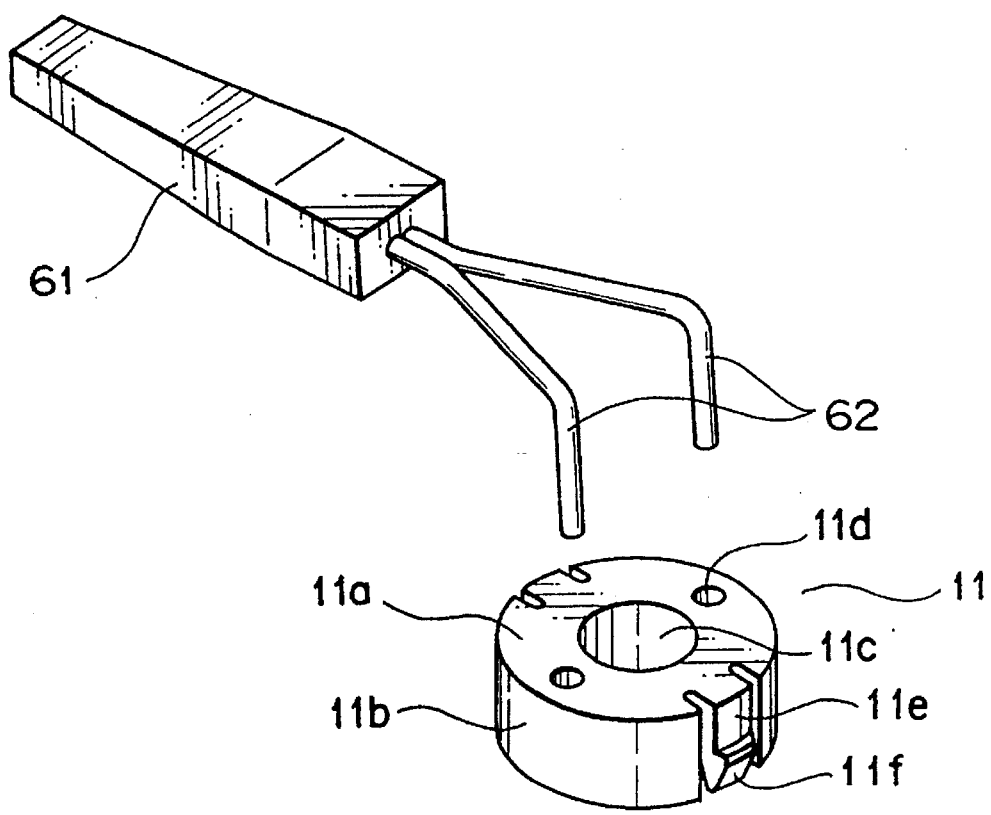
FIG. 7 is a perspective view showing an insulator cap shown in FIG. 6 and a removing jig in a separated state.

On an internal wall of the male terminal housing section 7, guide grooves 7d, 7d are formed extending axially and corresponding to tile flexible locking lugs 11e, 11e for engaging and guiding the corresponding locking projections 11f, 11f. Further, a terminal guide 7e is fixedly provided in the male terminal housing section 7 for receiving therethrough the male terminal D to prohibit lateral displacement thereof. As shown in FIG. 6, the guide groove 7d has a taper $7d_1$ at its one side and the corresponding locking projection 11f also has a taper $11f_1$ at its one side. The tapers $7d_1$ and $11f_1$ confront each other and cooperatively work for releasing engagement between the guide groove 7d and the corresponding locking projection 11f.

Numeral 61 represents a removing jig for removing the insulator cap 11 from within the male terminal housing section 7. The removing jig 61 has a pair of removing pins 62, 62 to be inserted into the foregoing removing pin insertion holes 11d, 11d.

Referring back to FIG. 3, an annular flange 2b is provided around an outer periphery of the connector body 2 at its rear end for sliding movement on an internal wall 1a of the cases 1, 1'. In the connector body 2, pin housing rooms 13 are formed between the male terminal housing sections 7 and the composite terminal housing sections 8. In each pin housing room 13, a compliance pin 15 biased forward by a coil spring 14 is slidably received as extending through a guide hole 13a formed in the bottom wall 2a. Numeral 16 represents a stopper for the compliance pin 15, and numeral 17 represents a rear holder for preventing the male terminal D from slipping out rearward.

The handle 4 has a bent shape including a front straight pipe portion 4a and a rear inclined pipe portion 4b, and also works as a protector for the leads W, w of the cable C. The front pipe section 4a is slidably supported by the case in an opening 1b provided at a rear end of the case. On the other hand, the rear pipe section 4b has a mounting hole 4c at its rear end where a protect case 20 of the cable C is fixedly mounted using a fixture 20a. Numeral 21 denotes a grip made of an elastic material, such as, synthetic rubber. The grip 21 has a bellows portion 22a followed by a waterproof cap 22 which is firmly fitted into an annular groove 1c formed at the rear end of the cases.

Figure 9:
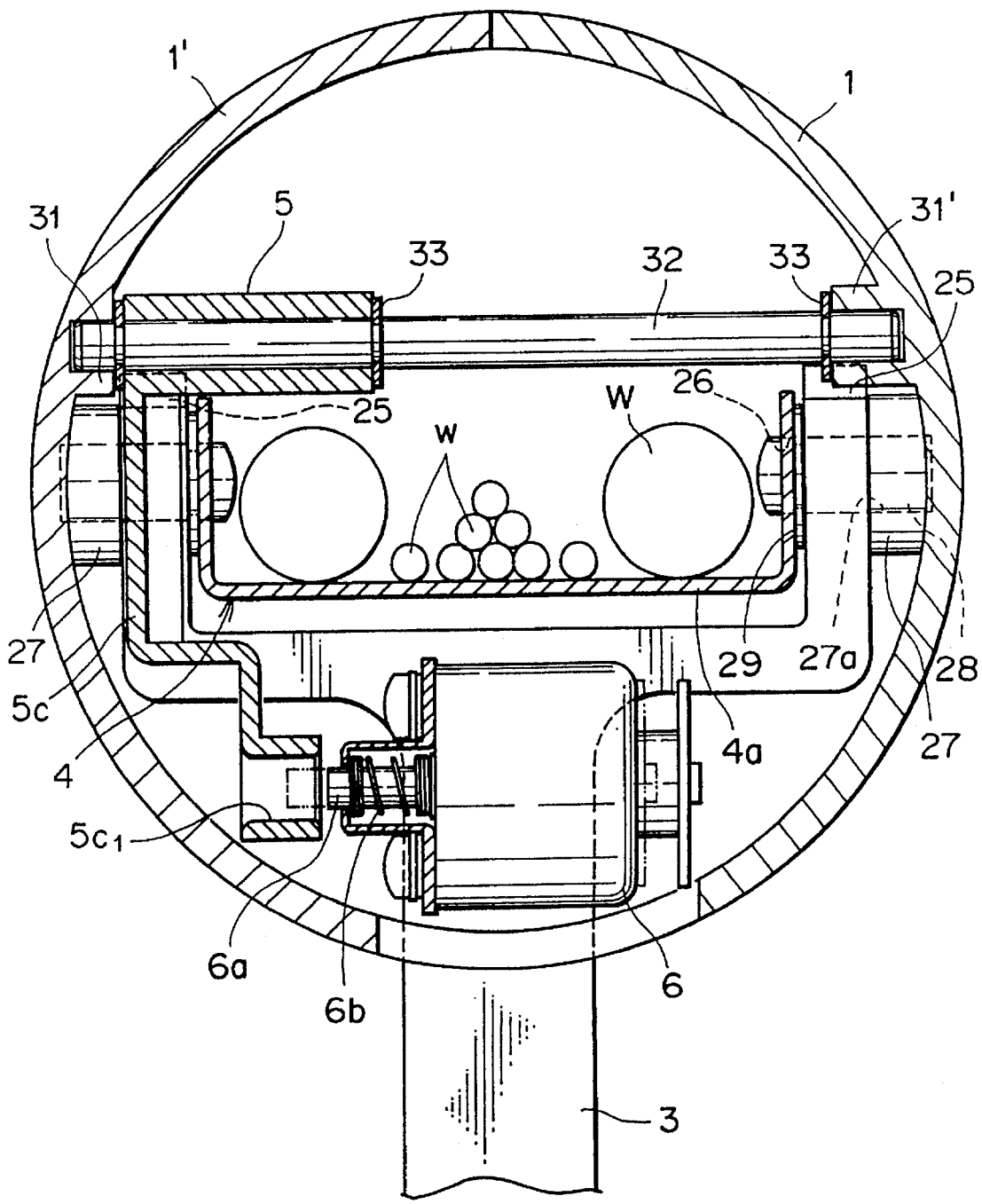
FIG. 9 is a cross-sectional view showing a mounting structure of two levers shown in FIG. 3.

The lever 3 has a long operating portion 3a and a short acting portion 3b which are crossed to form an L-shaped lever. The acting portion 3b has an elongate hole 23 at its base and is pivotally supported by a lever shaft 24 which is received through the elongate hole 23 and fixed to the cases at a rear side thereof. As shown in FIG. 9, the acting portion 3b has a distal end where a bifurcate supporting section having a pair of supporting pieces 25, 25 is formed. Each supporting piece 25 is pivotally supported by a pin 28 which passes through a hole 26 formed in a side wall of the front pipe section 4a of the handle 4 and into an elongate hole 27a of a boss 27 protrudently provided on an internal wall of the case 1 (1'). Numeral 29 represents a snap ring for the pin 28. As shown in FIG. 3, an end surface 25a of the supporting piece 25 is of an arch-shape. The arched end surface 25a is formed with a step 25b for an engagement projection $5a_1$ of a releasing lever 5. Further, a return spring 30 is fitted around the lever shaft 24 so that the lever 3 is biased in a direction P.

The releasing lever 5 has an acting arm 5a extending in an axial direction of the connector body 2, an operating arm 5b extending rearward to the exterior of the cases, and a locking arm 5c extending downward, so as to form an essentially T-shaped releasing lever. As shown in FIG. 9, an intermediate portion of the releasing lever 5 is rotatably or pivotally supported above the handle 4 by a straight pin 32 arranged between bosses 31, 31' on an internal wall of the cases 1, 1' and a snap ring 33. The acting arm 5a is positioned such that a lower surface of the acting arm 5a is in sliding abutment with the arched end surface 25a of the lever 3. The acting arm 5a has at its tip the engagement projection $5a_1$ for engagement with the foregoing step 25b. The acting arm 5a is biased toward the arched end surface 25a by a coil spring 34 mounted to an internal wall of the case 1'. The locking arm 5c has a locking hole $5c_1$ at its lower end. A electromagnetic coil 6 having a plunger 6a and a coil spring 6b is fixed to the case 1'. The plunger 6a is arranged to confront the locking hole $5c_1$. When the electromagnetic coil 6 is energized in response to complete fitting or connection between the feeder-side connector A and the receiver-side connector B, the plunger 6a displaces into the locking hole $5c_1$ so as to lock the releasing lever 5. On the other hand, the electromagnetic coil 6 is deenergized when the charging is finished, so that the plunger 6a is instantly returned to the initial position due to a restoring spring force of the coil spring 6b so as to unlock the releasing lever 5.

At an intermediate portion of the cases 1, 1', locking chambers 35, 35' are formed in bulged fashion in vertically opposite locations and extend over the front side of the cases which accommodates the connector body 2. Further, openings 35a, 35a' are formed forward of the locking chambers 35, 35', respectively. Numerals 36, 36' represent locking arms relative to the receiver-side connector B. The locking arm 36 is pivotally supported at its intermediate portion by a pin 37 in the locking chamber 35. One end of the locking arm 36 extends to the outer periphery of the cases via the opening 35a and has a hook-like locking pawl 36a at its tip. The other end of the locking arm 36 extends rearward to work as an acting piece 36b relative to the acting arm 5a of the releasing lever 5. Between the fulcrum (pin 37) and the locking pawl 36a at the tip, a stepped portion 36c bent outward and a spring mounting portion 36d of a reversed-angular-C shape in cross-section facing toward the connector body 2 are provided. To the spring mounting portion 36d is mounted a plate spring 38 confronting the foregoing compliance pin 15. On the other hand, one end of the locking arm 36 extends to the outer periphery of the cases via the opening 35a' and has a so-called semi-lock type mountain-shaped locking piece 36a'. The other end of the locking arm 36' is pivotally supported by a pin 37'. The other structure is essentially the same as the locking arm 36 except that the acting piece 36b is not provided. These locking arms 36, 36' are biased inward due to coil springs 39, 39, respectively.

An LED accommodating room 40 is formed in bulged fashion rearward of the upper locking chamber 35. An LED 41 is mounted in the room 40 for displaying a state of "feeding".

Figure 4:
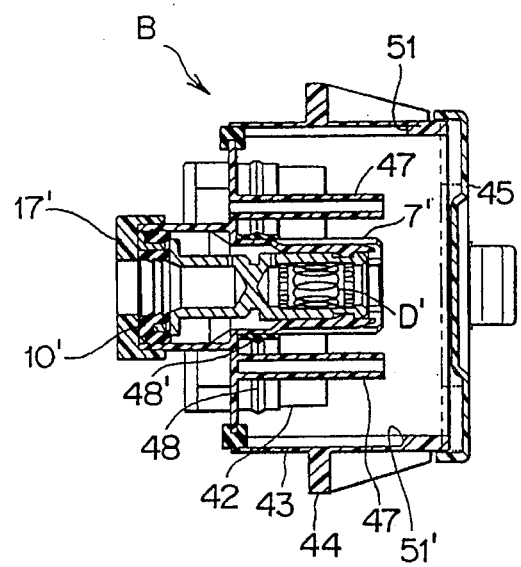
FIG. 4 is a longitudinal-sectional view showing the receiver-side connector shown In FIG. 1.

As shown in FIGS. 1 and 4, the receiver-side connector B has a connector body 42 where female terminals D' are mounted corresponding to the foregoing male terminals D. A shell 43 for receiving the tip portion of the cases of the feeder-side connector A is fitted over the outer periphery of the connector body 42 in sealed fashion. The shell 43 is fixed to the vehicle body by means of a flange 44 provided around the outer periphery of the shed 43 and bolts (not shown). A closure cap 45 is provided at an open side of the shell 43. Specifically, the cap 45 is mounted to the shell 43 by a pin (not shown) to be able to open or close. The cap 45, when closed, is locked by engagement of a locking portion 45a of the cap 45 and a locking arm 46 mounted onto the outer periphery of the shell 43. In the connector body 42, operating bosses 47 for the foregoing compliance pins 15 of the feeder-side connector A are arranged to be projected. Numeral 7' denotes female terminal housing section, numeral 10' denotes a waterproof rubber plug, and numeral 17' denotes a rear holder. Since these elements are essentially the same as those of the feeder-side connector A, detailed explanation thereof is omitted. Numerals 48, 48' denote waterproof sealing packings.

Further, in order to facilitate positioning the feeder-side connector A and the receiver-side connector B when coupling them, projecting lines 49 are formed axially on the outer periphery of the cases 1, 1' and corresponding guide grooves 50 are formed on an internal wall of the shell 43. Moreover, on the internal wall of the shell 43, locking steps 51, 51' are formed corresponding to the foregoing locking arms 36, 36'. On the other hand, in FIG. 1, numeral 52 represents a screw for fixing the split cases 1, 1' together.

In the foregoing description, the feeder-side connector A uses the male terminals D and the receiver-side connector B uses the female terminals D'. However, this may be reversed.

Figure 5:
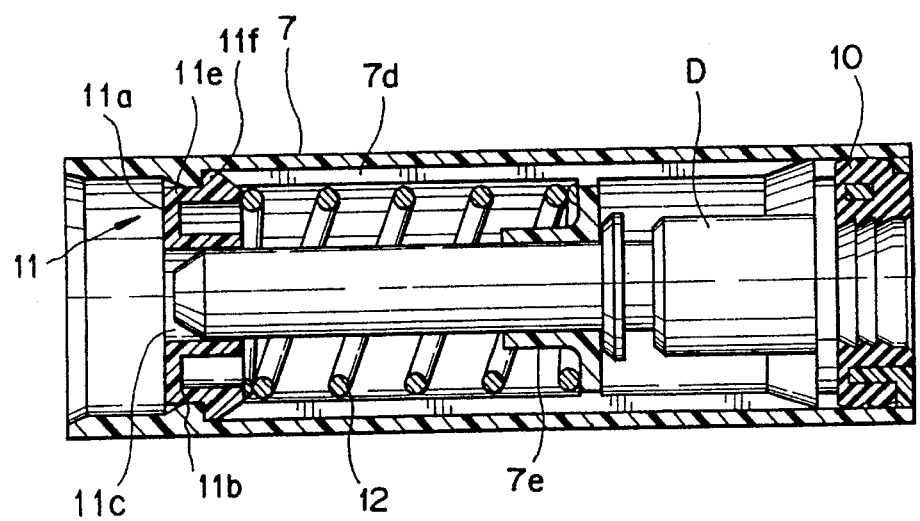
FIG. 5 is an enlarged longitudinal-sectional view showing a male terminal housing section of the feeder-side connector shown in FIG. 3.

In the foregoing structure, when the insulator cap 11 is forced into the male terminal housing section 7 from the front open side by matching positions of the guide grooves 7d, 7d and the flexible locking lugs 11e, 11e, the flexible locking lugs 11e, 11e contracts or deforms inward temporarily due to the presence of the locking projections 11f, 11f, and then elastically restores when having reached the guide grooves 7d, 7d. Due to the biasing force of the spring 12, the insulator cap 11 is forced forward so that the locking projections 11f, 11f collide with front end walls of the guide grooves 7d, 7d. Accordingly, the insulator cap 11 is prevented from slipping out forward. As shown in FIG. 5, this allows the front wall 11a of the insulator cap 11 to be positioned forward of the tip of the male terminal D so as to shield the male terminal D from the exterior. This makes it possible to avoid the electric shock due to contact of a fingertip to the male terminal D since the state of FIG. 5 is ensured before using the feeder-side connector A relative to the receiver-side connector B and when the feeder-side connector A is removed from the receiver-side connector B.

Figure 8:
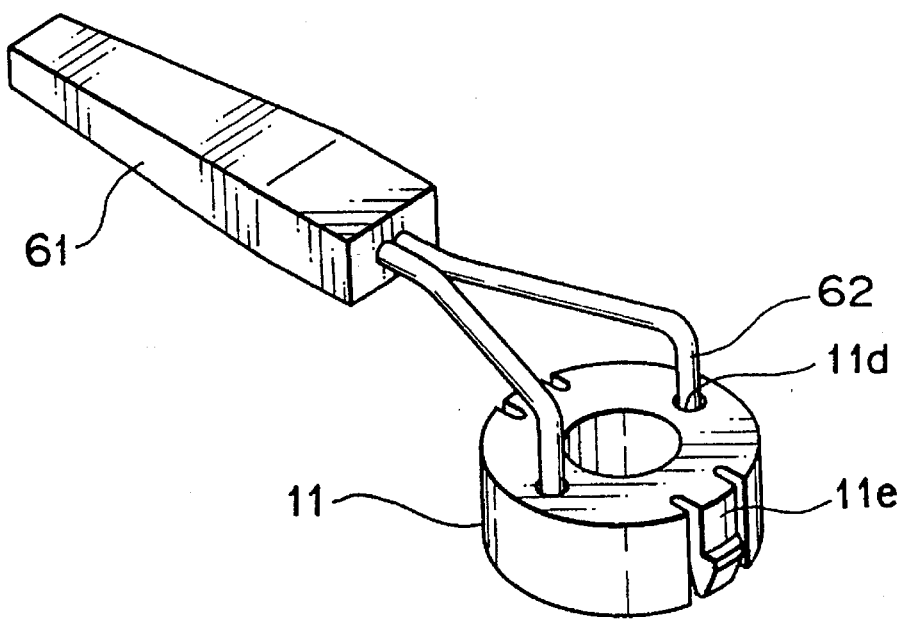
FIG. 8 is a perspective view showing the insulator cap and the removing jig in a combined state.

When necessity occurs to remove the insulator cap 11 from within the male terminal housing section 7 for, such as, fixing the feeder-side connector A, the insulator cap 11 can be easily removed in the following manner:

In the state of FIG. 5, the removing pins 62, 62 of the removing jig 61 are inserted into the removing pin insertion holes 11d, 11d of the insulator cap 11 as shown in FIG. 8. Thereafter, by twisting the insulator cap 11 in a direction L as shown in FIG. 6, the insulator cap 11 can be turned in the direction L due to presence of the engagement releasing tapers $7d_1$, $11f_1$.

As a result, the engagement between the locking projections $11f$ of the flexible locking lugs $11e$ and the guide grooves $7d$ are released. Further, due to the biasing force of the spring 12, the insulator cap 11 is forced out of the male terminal housing section 7. Accordingly, the insulator cap 11 can be easily removed from inside the male terminal housing section 7 without damaging the mounted male terminal D and the insulator cap 11 itself.

Now, a method of using the feeder-side connector A will be described hereinbelow.

When the feeder-side connector A is not used, the flange $2b$ at the rear end of the connector body 2 engages with the stepped portions 39 of the locking arms 36, 36' which are urged inward by the coil springs 39. Accordingly, the connector body 2 is unable to advance forward, and thus, the pivotal movement of the lever 3 in a direction Q is also prohibited.

Figure 10:
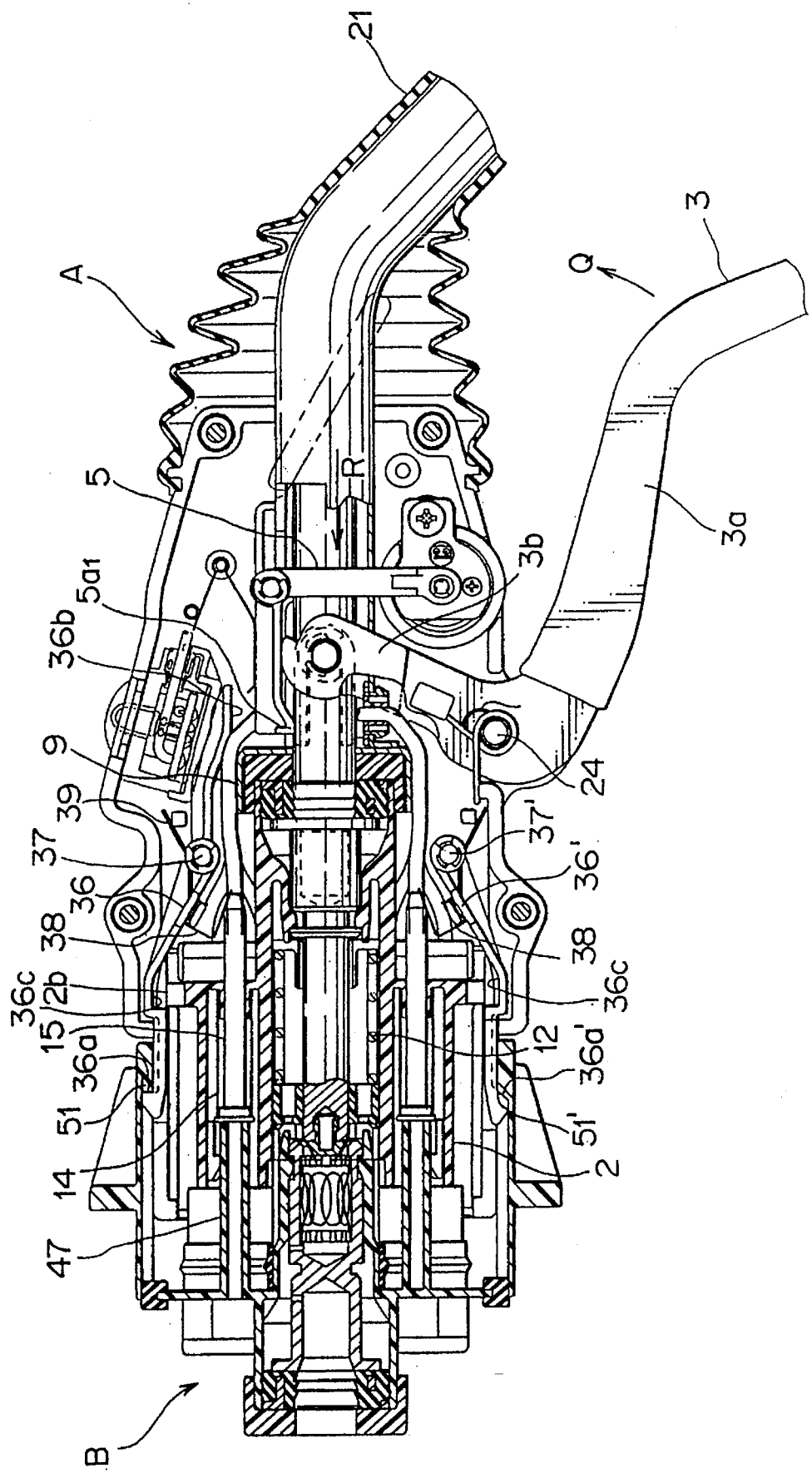
FIG. 10 is a longitudinal-sectional view showing a temporary fitting state of the feeder-side and receiver-side connectors shown in FIG. 1.

FIG. 10 shows a temporary fitting state between the feeder-side connector A and the receiver-side connector B. When fitting the feeder-side connector A to the receiver-side connector B, the positions of the projecting lines 49 provided on the outer periphery of the cases of the feeder-side connector A are matched with those of the guide grooves 50 provided on the inner wall of the shell 43, and then the cases 1, 1' are inserted into the shell 43. This causes the operating bosses 47 of the receiver-side connector B to push the compliance pins 15 inward against the biasing force of the coil springs 14. As a result, the locking arms 36, 36' are turned about the pins 37, 37' via the plate springs 38, 38 so as to turn the tip end sides of the locking arms 36, 36' outward, that is, toward the outer periphery of the cases. This causes the locking pawl and piece $36a$, $36a'$ to be engaged with the locking steps 51, 51' of the shell 43 so that the connectors A and B are temporarily locked.

Figure 11:
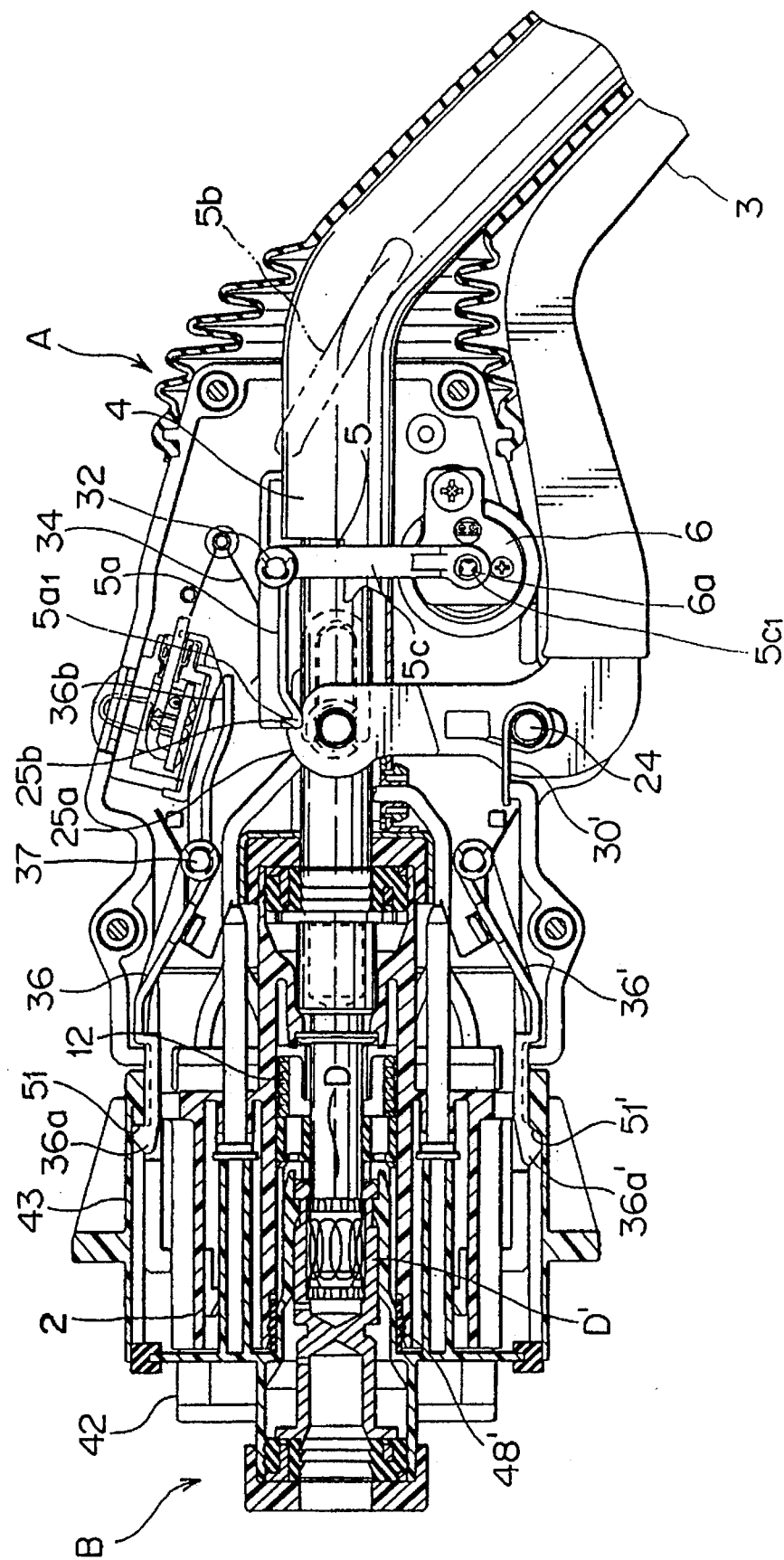
FIG. 11 is a longitudinal-sectional view showing a full fitting state of the feeder-side and receiver-side connectors shown in FIG. 1.

In this state, when the operating portion $3a$ of the lever 3 is held and turned in the direction Q, the acting portion $3b$ turns about the lever shaft 24 so that the handle 4 advances in a direction R. Accordingly, the connector body 2 is forced forward against the biasing force of the springs 12 via the pressing plate 9. As a result, as shown in FIG. 11, the connectors A and B, that is, the connector bodies 2 and 42 are fully engaged and locked, and the male terminals D and the female terminals D' are fully connected.

At the time of the full fitting engagement between the connector bodies 2 and 42, the insulator caps 11, 11 are pushed rearward against the biasing force of the springs 12, 12 due to the female terminal housing sections 7', 7' advancing into the male terminal housing sections 7, 7.

In the course of the operations from the temporary fitting of the connectors A and B to the full fitting thereof, the arched end surface $25a$ of the lever 3 slides along the acting arm $5a$ of the releasing lever 5 to raise the acting arm $5a$ against the biasing force of the coil spring 34 due to the pivotal movement of the lever 3. When the full fitting is accomplished so that the arched end surface $25a$ passes over the engagement projection $5a_1$, the acting arm $5a$ is instantly returned to the initial posture due to the restoring force of the coil spring 34. This causes the engagement projection $5a_1$ to engage with the step $25b$ of the lever 3 so that the lever 3 is locked by the releasing lever 5 primarily.

Figure 12:
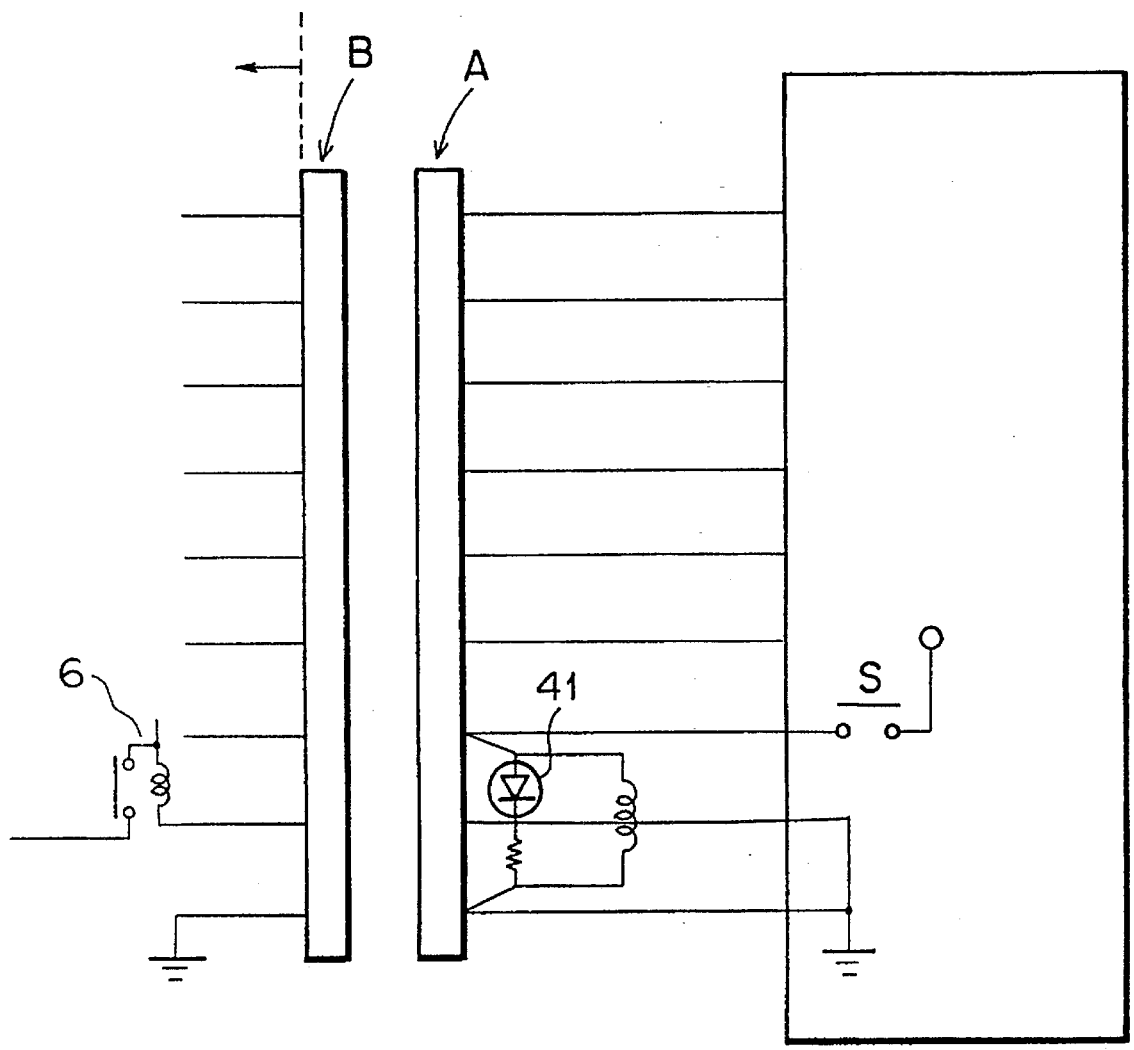
FIG. 12 is a circuit diagram of the feeder-side and receiver-side connectors shown in FIG. 1.
Figure 13:
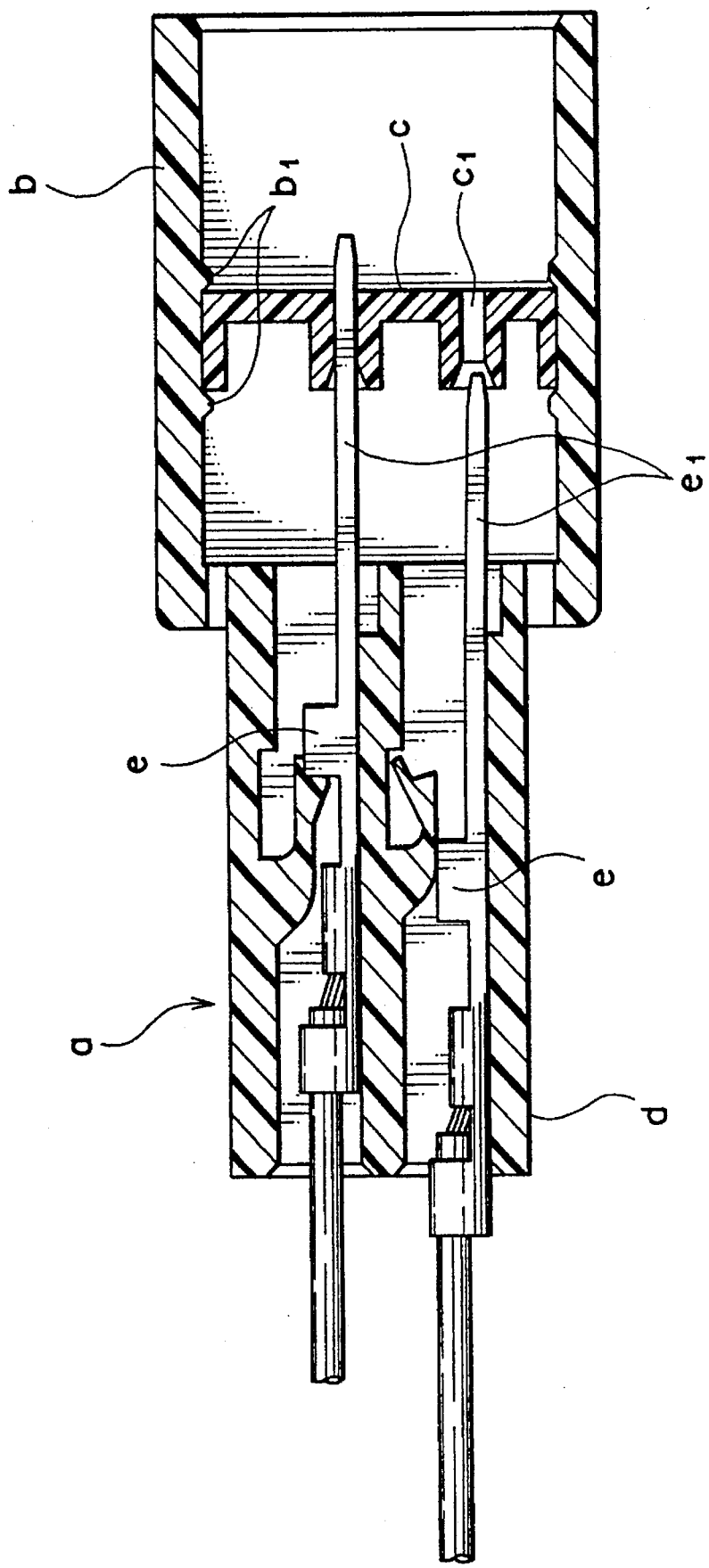
FIG. 13 is a diagram for explaining a structure of a conventional connector.

In the full fitting state of the connectors A and B, as shown in a circuit diagram of FIG. 12, when a switch S is closed, the LED 41 is lit on. Simultaneously, the electromagnetic coil 6 is energized so that the plunger $6a$ (see FIG. 9) advances into the locking hole $5c_1$ of the locking arm $5c$ of the releasing lever 5 to lock the releasing lever secondarily.

Accordingly, the lever 3 is double locked. As a result, when an attempt is made in error to depress the operating arm $5b$ of the releasing lever 5 so as to release the lock during the feeding, since the lever 5 is locked by the plunger $6a$ of the electromagnetic coil 6, the detachment of the connectors A and B from each other during the feeding is reliably prevented.

The detachment of the connectors A and B is performed as follows:

When the charging is finished, the electromagnetic coil is deenergized due to the operation of the foregoing control circuit. Accordingly, the plunger $6a$ is instantly returned to the initial position by means of the coil spring $6b$ so that the secondary lock of the releasing lever 5 is released.

Subsequently, the operating arm $5b$ of the releasing lever 5 exposed to the exterior of the cases Is depressed to release the engagement between the releasing lever 5 (projection $5a_1$) and the lever 3 (step $25b$). This causes the connector body 2 to be separated from the connector body 42 due to the biasing forces of the springs 12 and the return spring of the lever 3. Simultaneously, the insulator caps 11 are instantly returned to the foregoing shielding position due to the biasing force of the springs 12, and the lever 3 is also instantly returned to the initial position.

When further depressing the operating arm $5b$ of the releasing lever 5, the acting arm $5a$ turns up the operating piece $36b$ of the locking arm 36 about the pin 37 so that the hook-like locking pawl $36a$ is turned down. As a result, the engagement between the locking step 51 on the inner wall of the shell 43 and the hook-like locking pawl $36a$ is released. Since the locking piece $36a'$ of the other locking arm 36' engaging with the locking step 51' is of a so-called semi-lock type as described before, the engagement therebetween is easily released by pulling the feeder-side connector A.

It is to be appreciated, if an operator's hand is released from the releasing lever 5 when the lock of the lever 3 is released, since the arched end surface $25a$ of the lever 3 pivoted to the handle 4 is in abutment with the acting arm $5a$ of the releasing lever 5, the arched end surface $25a$ raises the acting piece $36b$ of the locking arm 36 by forcing the handle 4 reward to enable the releasing operation of the connectors A and B.

As appreciated from the foregoing description, the locking and releasing operations of the connectors A and B can be accomplished quite easily.

Further, in the fully fitting and locking state, the case tip portion of the feeder-side connector A is fitted into the shell 43 of the receiver-side connector B, and the waterproof packing 48 is interposed between the cases 1, 1' and the connector body 42, and further, the waterproof packing 48' is interposed between the male terminal housing sections 7 and the female terminal housing sections 7'. Accordingly, the double-waterproof sealing is ensured.

Further, since an axis of the plunger $6a$ for the secondary lock of the releasing lever 5 and an axis of the lever shaft 24 of the lever 3 are offset from each other, even when the lever 3 is turned in error in the locking state, such a force is prevented from directly acting on the plunger $6a$ so that damage is effectively avoided.

Further, although the lever 3 is mounted to the handle 4 in the foregoing preferred embodiment, the lever 3 may be directly mounted to the connector body 2.

It is to be understood that this invention is not to be limited to the preferred embodiments and modifications described above, and that various changes and modifications may be made without departing from the spirit and scope of the invention as defined in the appended claims.

What is claimed is:

1. A connector comprising:

a connector body;

a male terminal housing section provided in said connector body, said male terminal housing section having therein a male terminal extending toward an opening of said male terminal housing section, said male terminal housing section adapted for receiving a counter-female terminal housing section from said opening for connection between said male terminal and a female terminal disposed in said counter-female terminal housing section; and an insulator cap reciprocally slidable within said male terminal housing section and biased toward said opening by biasing means, said insulator cap having a first wall confronting said opening, said first wall having a guide hole for said male terminal and being located at a position forward of a tip of said male terminal relative to said opening, wherein said insulator cap is forced rearward within said male terminal housing section relative to said opening against a biasing force of said biasing means while guiding said male terminal through said guide hole when said female terminal housing section is received in said male terminal housing section.

2. The connector as set forth in claim 1, wherein said insulator cap is located at said position against the biasing force of said biasing means by stopper means provided on said insulator cap and within said male terminal housing section.

3. The connector as set forth in claim 1, wherein said insulator cap has a double tube structure having an outer tube and an inner tube which are connected by said first wall, wherein said outer tube is arranged to be slidable on an inner wall of said male terminal housing section, and wherein said inner tube forms said guide hole therethrough, said inner tube receiving and positioning therein the tip of said male terminal.

4. The connector as set forth in claim 1, wherein said insulator cap has a peripheral wall integral with said first wall, wherein said peripheral wall includes a flexible locking piece integral therewith, said flexible locking piece having a locking projection at its tip, and wherein said male terminal housing section is formed on its inner wall with a guide groove for engaging and guiding said locking projection of the flexible locking piece.

5. The connector as set forth in claim 4, wherein said first wall is formed with removing pin insertion holes radially outward of said guide hole, wherein said locking projection has a releasing taper at its one side and said guide groove has a corresponding releasing taper at its one side confronting said releasing taper of the locking projection, and wherein the engagement between said locking projection and said guide groove is released by turning said insulator cap toward said one side of the guide groove via said removing pin insertion holes when said insulator cap is located at said position.

* * * * *